Patented Feb. 19, 1946

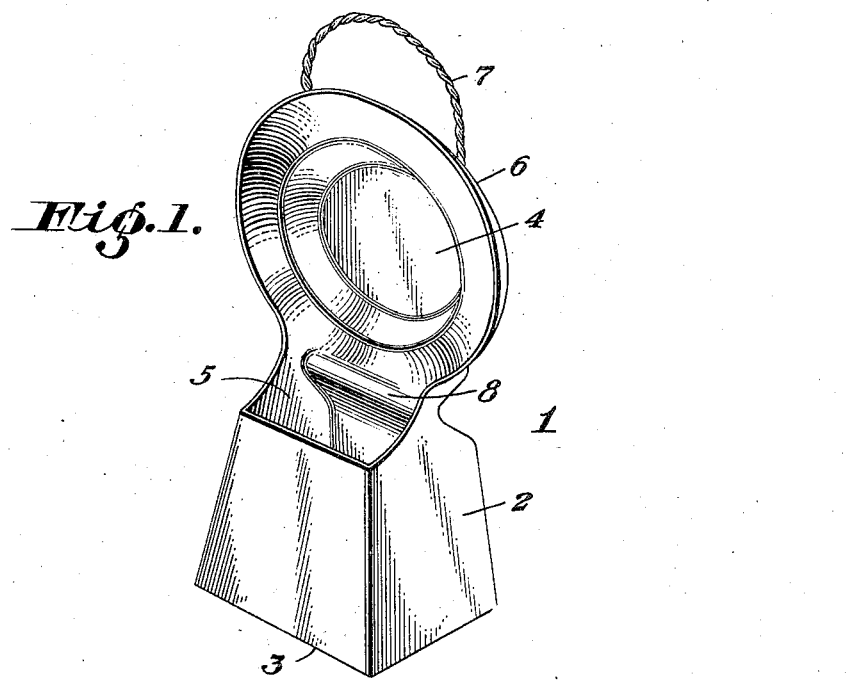
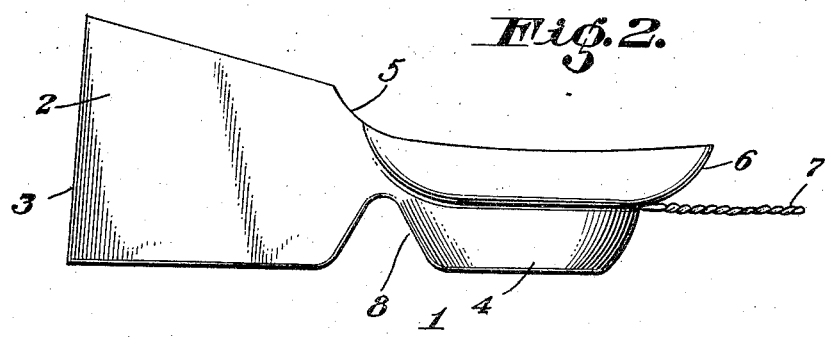
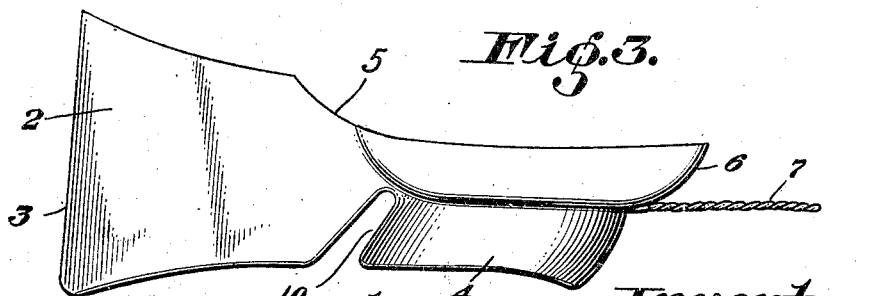

2,395,084

UNITED STATES PATENT OFFICE 2,395,084

SANITARY FOOD SHELTERING AND EATING PLATE DEVICE

Melanie Wolf, New York, N. Y.

Application February 1, 1943, Serial No. 474,256

4 Claims. (Cl. 65—15)

The present invention pertains to improvements in tableware, and has for its primary object to provide an eating plate which keeps the food in a sheltered condition up to the time the food is actually consumed. My device will be particularly useful in public eating places, like cafeterias, restaurants, lunchrooms and other food-vending places of all kinds; also for the Army and Navy and on submarines as well as the Air Corps, and wherever saving of time and space at mealtime is essential and wherever accommodations for serving meals are limited, and wherever a good many persons accumulate to eat at practically the same time.

One of the main objects of my invention is its sanitary aspect; at the present time it is customary in food-vending places to place the food desired by the consumer on a plate where it immediately offers a comparatively large surface to exposure and consequently to various kinds of contamination. It is a well known fact that a great many persons who are afflicted with communicable ailments and diseases, like common colds, tuberculosis, influenza, diseases of the nose and throat, syphilis and the like, and who are seated at the same eating table with other persons, are very careless in regard to protecting their fellow-men from infection, and very frequently sneeze and cough without temporarily covering their mouth and nostrils at all, and thus spread a rain of droplets of saliva and mucus as well as micro-organisms, pathogenic and otherwise, over the food of the persons seated at the same or nearby tables who thus are almost compelled to eat the food contaminated in this manner; many an epidemic may easily have its inception through these and similar causes and one important object of my device consists in guarding against these unsanitary conditions.

Another menace threatening the public health consists in the fact that in restaurants, cafeterias and similar public eating places, the person portioning out the food on the individual serving dishes and eating plates, as well as the waiter who serves the food to the ultimate consumer, almost universally bring their thumbs in contact with the rim of the eating plate and frequently with the food itself while serving the same, and it is also a well-known fact that a good many waiters and food-handling persons suffer from various kinds of communicable diseases whose pathogenic bacteria very frequently adhere to their unwashed hands and fingers, and who thus expose the consumer to the contraction of sometimes dreadful diseases; the employment of my device makes this hazardous contact unnecessary inasmuch as the hands and fingers of the food-serving person are merely to come in contact with the outside and the handle of my device.

My device, on account of its various advantages and also of its compact and practical construction will be particularly useful to our armed forces, the Army and other military branches of various kinds as well as for our Navy; whether the device would be in its upright or its horizontal position, and in either position the food will be guarded against any undue spilling caused by the irregular movements of the respective vessel. For similar reasons my device will be also highly useful on board of submarines, where quarters are usually limited and riding conditions are oftentimes very irregular and uneven.

My device will be of equally high value to the Air Corps and on all kinds of air-liners, and particularly so when uneven flying conditions are present or during unfavorable weather; the same advantages as just described in connection with my device could be readily made use of.

My device would be equally useful on railroad-trains where passengers could conveniently be served with their meals while in their coach seats inasmuch as no table surface would be necessary when my device is being employed, as each consumer could very conveniently support my device on his lap while having his meal; for the same reason the passengers in an air-plane or air-liner could also be served while remaining in their seats, particularly so during rough or stormy weather. My device also provides at the same time a clean sanitary place for the consumer's eating utensils, napkin and similar articles, which otherwise may be placed on an unclean and possibly infected table surface; another great advantage of my device is the fact that the entire meal, when getting chilled, could be easily reheated and while remaining in the same appliance inasmuch as it would be simply necessary to bring the device to its upright position whereby the food would slide back into the food-sheltering portion of the device; and by standing the same over a source of heat, the meal may be easily reheated. Various other objects of my invention will appear in the course of the specification.

The construction of my device permits of slight variations, some of which are shown and described, but the essential and basic principle of all the figures shown and described is practically the same; the slight though important variations shown and desribed, however, are highly practical for our Army, our Navy and our Air Corps, as the case may be, as well as for our civilian population.

In the accompanying drawing similar figures denote corresponding parts.

Fig. 1 shows my device standing upright on its broad standing base; Fig. 2 shows an elevation of my device in a horizontal position; Fig. 3 indicates a side elevation of a device, in horizontal positon, with a modified ridge.

Fig. 1 represents my device in its upright standing position. It consists of an eating plate 1 whose part 4 is shaped similar to a portion of an ordinary eating plate, while the portion 2 is roofed over so as to form a pocket portion, as shown in the drawing; the pocket portion terminates in a widened substantial standing base 3 which supports and maintains the device in its upright standing position when so placed, as shown in the drawing. The roofed-in portion 2 communicates by the mouth 5 with the non-roofed portion 4 of the eating plate 1; inasmuch as both, the roofed-in and the non-roofed portions are formed by the same eating plate and are therefore continuous as shown in the drawing, the mouth 5 by which the roofed-in portion 2 communicates with the non-roofed portion 4 of the eating plate 1 faces upward towards the face of the portion 4 while the device stands in its upright position and as illustrated. 8 indicates an upward elevation raised on the face of the eating plate 1 and running transversely and above the opening 5 of the roofed-in portion 2 and controlling the spontaneous outflow of the contents of the roofed-in portion 2 of the eating plate 1 onto the non-roofed portion 4 and vice versa when the device is placed in its horizontal position, as shown in Fig. 2. 6 indicates the rim of the eating plate 1 and which is shown on the non-roofed portion 4, but blends with and is continuous with the food-sheltering portion 2. As shown in the drawing, the non-roofed portion 4 of the eating plate 1 gives attachment at its reverse surface to the carrying handle 7; the latter is shown to be flexible, but may be rigid and of any suitable construction desired, and has for its purpose to facilitate the bringing of the device from its upright standing position to its horizontal position and vice versa, and also to facilitate the upright carrying of the device from one place to another. The elevation 8 may be constructed to be of any suitable height and width desired, and serves the purpose throughout its transverse extent of controlling the food contained in the food-sheltering portion 2 of the eating plate 1 from pouring out spontaneously and immediately onto the non-roofed portion 4 and vice versa as soon as the device is placed in its horizontal position. The food-controlling elevation 8 which runs transversely across the face of the eating plate 1 may rise from the face of the latter either gradually so as to form an angle towards its summit, or it may rise abruptly from the face of the eating plate 1 which latter method is shown in cross section in Fig. 2. My device may be made of any suitable material desired as, for instance, enamelware or any other metal, glass or heat-resisting glass or any suitable plastic material, paper-material, porcelain, rubber, etc., or a combination of various kinds of material, like glass combined with metal or the like. The material used for my device may be of varying thickness and the same may be thickened and re-enforced in some places wherever indicated and desired.

It may be noted that my device stands very securely in its upright standing position on its substantial standing base 3; this standing stability is greatly increased whenever food is placed into the pocket portion 2 while the device is in its upright standing position, and thus cause the device to stand increasingly firm as the food is being filled into the food-sheltering portion 2 of the eating plate 1; if the food to be placed into the food-sheltering portion 2 is of loose consistence, like salads, small cakes or the like, or if the device is of comparatively small dimensions, it may be preferable to make the device of heavy material. Another advantage of my device is the fact that inasmuch as a good many persons feel squeamish about having the entire meal they are about to eat, exposed to the view of other guests seated at the same table, the bulk of the meal, when my device is being used, remains concealed in its sheltered position within the roofed-in portion 2 of my device up to the time when the food is removed from the same by the user onto the non-roofed portion 4 of the device to be consumed.

It may also be readily noted from the drawing representing Fig. 2, how effectively the elevation 8 serves as a dam against the immediate and spontaneous outflow of the food from the roofed-in portion 2 onto the non-roofed portion 4 of the device. The eating plate 1 is represented in Fig. 2 in cross section and in a horizontal position. When my device is being used, the same is stood up in its upright position and as shown in Fig. 1; and when the food is placed into the pocket portion 2 of the eating plate 1, the food goes immediately to the bottom 3 of the pocket portion 2, thereby greatly increasing the upright standing stability of the device. Whenever the standing base is not used, the device may be held by its handle in its upright position while the food is placed into its roofed-in portion 2; the latter may be as roomy as desired. If it is desired to fill the food-sheltering portion 2 of the eating plate 1 with liquid or semi-liquid food and to have part of such food pour out immediately onto the non-roofed portion 4, it is simply necessary to have the elevation 8, which controls the free flow of the food, constructed of a lower height whereby part of the liquid or semi-liquid food would pour immediately over the elevation 8 and onto the non-roofed portion 4 as soon as the device is placed in its horizontal position, while the rest of the food would remain within the food-sheltering portion 2; the non-roofed portion 4 of the eating plate 1 is used like any ordinary eating plate when the device is placed in a horizontal position. It may be readily noted that the elevation 8 may be of varying height, higher or lower as the case may be; if it is sufficiently high, no food would flow spontaneously onto the non-roofed portion 4 when the device is placed in a horizontal position; if the elevation 8 is of comparatively low height and the pocket portion 2 has not been filled up with liquid or semi-liquid food but only partly so, the same result would be obtained; the transverse elevation 8 does not necessarily have to be of the same height throughout its extent. The mouth 5 of the roofed-in portion 2 of the eating plate 1 is of sufficient size to permit of the placing of the food into the pocket portion 2 while the device stands in its upright position as well as to permit its removal by a suitable table utensil while the device is in a horizontal position. The mouth 5 of the roofed-in portion 2 may be provided with a temporary cover which would be particularly useful when my device would be used during military maneuvers and in localities where dust or flies in great quantities are present. Whenever so desired, the elevation 8 which is raised on the face of the eating plate 1, may be situated in a more or less anterior position in relation to the mouth 5 than the one shown in the drawing, thereby increasing or decreasing the relative capacity of the mouth 6 as well as the capacity of the non-roofed portion 4; the latter may be comparatively small or it may be of sufficient capacity to hold the entire contents of the roofed-in portion 2.

Fig. 2 represents my device in a horizontal position. In the drawing, 1 indicates the eating plate, 2 represents its roofed-in portion, 4 denotes the non-roofed portion of the eating plate 1, and 6 indicates its rim which blends with and is continuous with the pocket portion 2; 3 designates the wide broad standing base which supports and maintains the device in its upright standing position in which it is shown in Fig. 1; 5 represents the mouth of the pocket portion 2 which communicates with the non-roofed portion 4 of the eating plate as shown in the drawing; 7 indicates the carrying handle of the device and which is represented as being flexible, but it may be rigid and of any suitable shape and length, and may be attached to either portion of the device. The elevation 8 may vary in height and width and is situated and formed on the face of the eating plate 1, as shown in the drawing, and guards against the food, which is contained in the roofed-in portion 2 of the device, from flowing spontaneously and immediately and in full bulk onto the non-roofed portion 4 of the device; as may be noted from the drawing, it is very convenient and easy to take the food in varying quantities from the pocket portion 2 onto the non-roofed portion 4 by any suitable table utensil and while eating, to leave the bulk of the food meanwhile in its sheltered place until gradually taken out by the user to be consumed. The elevation 8 may either rise gradually from the face of the eating plate 1 up to its transverse summit which would be located near the mouth of the roofed-in portion 2, or it could rise in a more abrupt manner, as shown in the drawing, and run transversely between the roofed-in and non-roofed portions of the eating plate as shown in the drawing. It may be readily noted from the drawing that the upper surface of the layer which forms the roof of the portion 2 of the device, is highly suitable for giving support to the user's table utensils, napkin, drinking cup or the like and, if so desired, the surface may be properly shaped or prepared for the purpose; this surface when also being used as a support for the user's used table utensils will prevent the soiling of the table cloth or table surface by these used utensils. As stated before, the pocket portion 2 could be made as roomy as desired and could be subdivided by interiorly placed partitions into a number of compartments if the meal to be served would consist of quite a number of courses; whenever it is desired to serve a meal, which in volume or number of courses would exceed the ordinary capacity of the roofed-in portion of the device, a highly practical way of providing a number of additional sheltered compartments would be provided by connecting two of my appliances together in a parallel manner, i. e., the roof of one appliance contacting the bottom of the roofed-in portion of the other, the latter being preferably selected with its non-roofed portion quite short; the roofed-in portion of each appliance could be subdivided into a number of compartments, and thus the roofed-in as well as the non-roofed portions of both appliances could be made use of by the consumer at the same time.

When my device is being used, it is placed in its upright standing position on its substantial standing base 3, as shown in Fig. 1 and other figures of my drawing; the food, whether solid or liquid, is placed into the pocket portion 2 of the eating plate 1, through the opening 5 where it immediately goes to the base 3 of the pocket portion, where, by its weight, it considerably increases the upright standing stability of my device; the latter is preferably left in this position until the consumer is ready for his meal, when he simply places the device in a horizontal position, as shown in Fig. 2; as stated before, the elevation 8 controls the outflow of the food from the roofed-in portion 2 onto the non-roofed portion 4 of the eating plate 1; the food may be gradually taken out or ladled out by the consumer from the roofed-in portion 2 through the opening 5 towards the non-roofed portion 4 which is used like any ordinary eating plate; it may be noted that the bulk of the food remains in a sheltered place up to the time it is actually consumed; it may also be noted that while the device is in its upright position, the roofed-in portion 2 retains the food it contains in a very compact manner, whereby its temperature is maintained for a prolonged period of time. The transverse elevation 8 which rises from the face of the eating plate 1 as shown, may do so while the face of the same is entirely flat instead of being curved as shown in the drawing. When my device would be used during military maneuvers, sport events or at similar occasions, and the men in the service or other persons, while dining, would have to interrupt their meals suddenly to be resumed later, they could simply stand up my device, which had been previously marked by a number or some other identification mark, to its vertical position, and all the appliances could be easily placed over a source of heat or be kept on a steam table or the like to reheat or maintain the food at the proper temperature. Or the food may be portioned out into the individual appliances and kept hot until served. The use of my device will also save a good deal of labor in dish-washing inasmuch as the entire meal may be contained in my device.

The carrying handle in all the figures shown may be flexible or rigid, as desired, and may be of any length and shape; its main purposes are to facilitate the placing of the device from an upright to a horizontal position and vice versa, and to carry the device conveniently from one place to another. Also, if it is made of sufficient length, for instance, and hingedly attached to the device, it may be swung down and assist in supporting the device in its upright standing position when rigid; also, when rigid, it may be used to raise the end of the device while the same is placed in a horizontal position, causing the food to accumulate at the front of the non-roofed portion so as to facilitate the complete consumption of the food.

Fig. 3 shows the device in a horizontal position; it is similar in construction to Fig. 2 and shows a food-controlling ridge in place of the food-controlling elevation shown in Fig. 2. In the drawing, 1 represents the eating plate, 2 shows its roofed-in portion and 4 indicates the non-roofed portion of the eating plate 1; 3 shows the substantial standing base of the device which supports the same in its upright standing position when so placed. 6 is the rim of the eating plate and which is continuous and blends with the roofed-in portion 2; 10 represents a ridge which is raised on the face of the eating plate 1, as shown, and serves to control the spontaneous outflow of food from the roofed-in onto the non-roofed portion of the device and vice versa; the food-controlling ridge 10 runs in a transverse direction and is shown to slant forward so as to increase the comparative size of the mouth of the roofed-in portion 2 without lengthening the outline of the device; this method would be particularly desirable whenever it is desired to have the device of comparatively short, squat construction and at the same time to have easy access to the contents of the roofed-in portion 2; the ridge 10 may be of any suitable height, length and shape desired and may be situated in relation to the face of the eating plate 1, in a more or less slanting position or at a right angle to the latter instead of the position as shown in the drawing, depending mainly on the height and capacity of the roofed-in portion 2, and the length of the wall forming the roof of the same. As shown in the drawing, the bottom face of the eating plate 1 is slightly curved which, in addition to other advantages, permits the user to consume all the food he places on the non-roofed portion of the device without tilting the same which would be particularly useful if the user of the device happens to be a child inasmuch as liquid or semi-liquid food would accumulate in the front of the non-roofed portion 4 of the device; 7 indicates the handle of the device which has been described previously. As shown in the drawing, the wall forming the roof of the roofed-in portion 2 is shorter than the parallel eating plate portion which extends from the base 3 to the ridge 10, and for this reason it may be readily noted that when the device stands in its upright position and the food is placed into the pocket portion 2, the latter can only be filled to its brim which is indicated by the free edge of the shortened wall forming the roof, and when the device is placed subsequently in a horizontal position, the level of the food, when liquid or semi-liquid, need not reach higher than the food-controlling ridge 10, depending on the height and slant of the ridge; whatever has been mentioned and described regarding the elevation 8 in connection with the Figs. 1 and 2, applies equally well to the food-controlling ridge 10, as in all the figures shown and described, both may be interchangeably used; the roofed-in portion 2 may be interiorly subdivided by partitions if so desired in order to keep each course of the meal separate within its sheltered place; it may be noted that the wall forming the roof of the roofed-in portion 2 provides a very convenient support for the user's table utensils while the device is in its horizontal position, as also described in connection with Fig. 2. It may also be noted that the ridge 10, when it is of hollow construction, as shown in the drawing, forms a recess below, which may be of sufficient width to permit of the introduction of the user's fingers and thus also to serve as a carrying handle, or an auxiliary handle which would be particularly useful when used for steadying the device to position on the arm of the user whenever he would be compelled to eat his meal while standing up, due to a scarcity of available table seats, or if he would be compelled, for similar reasons, to be seated where no table surface is available and he would have to support the device on his lap while he consumes his meal as, for instance, on board of military or civilian ships, on steamer-chairs or similar occasions. Whenever the roofed-in portion 2 is subdivided by interiorly placed partitions, the food-controlling ridge could be perforated just in front of the compartment to be used for this type of food, or one of the partitions subdividing the roofed-in portion 2 could be perforated and used for the purpose. Also, whenever the roofed-in portion 2 is subdivided, the food-controlling ridge in front of one or more compartments may be lowered or omitted whenever it is desired to have the liquid or semi-liquid food contained in these compartments flow out immediately onto the non-roofed portion 4 as soon as the device is placed in its horizontal position by the user.

For the purpose of this specification, the term "horizontal" is used to indicate a more or less horizontal position though always approaching it, and the term "upright" is used to approach or indicate a vertical position; also, in the drawing shown and described, both portions of the eating plate may be subdivided as desired, the roofed-in portion preferably by partitions placed in its interior for the purpose, and the non-roofed portion by raised lines on the surface so as to keep the various courses of a meal temporarily out of contact with each other.

In all the figures shown, the roofed-in portion 2, may also serve, while the device is in its upright position, as a guide as to the quantity of food it contains while it is being filled or partly filled with food; also, if so desired, the food-selling person may portion out the food on the non-roofed portion of the device while the same is in its horizontal position, for instance in cafeterias and similar food-vending places, in order that the consumer may see the portioned out meal, and the device then brought to its upright position whereby the food would slide into the roofed-in portion of the device. All surfaces of the device may be used to display printed rules of health, hygiene or other printing; also, the individual appliances may be marked or numbered or be finished in various colors to distinguish them from one another while one food-serving person carries and serves a number of them at the same time. In restaurants, cafeterias, lunchrooms or similar food-vending places the handle or other part of the device may be very conveniently used for the attachment of the user's paycheck by means of a loop of cord or the like.

It may be gathered from the foregoing that in addition to the sanitary features ascribed to my device, the same is highly practical and eminently suited to be made use of at numerous occasions in civilian life as well as being highly useful when used by the men in the service, i. e., the Army, the Navy, on board of submarines and all kinds of other ships and also highly useful when used by the men in the Air Corps in all its branches, at military maneuvers and numerous other occasions. To summarize some of the advantages of my device, it may be noted that it very efficiently shelters the food from external contamination, it guards the food from being unduly spilled; the surfaces of my device may be very effectively used to give support to the various table utensils of the user, and also to display various rules of health and hygiene; its use saves table space inasmuch as my device may contain the entire meal; the use of my device also serves a highly important sanitary purpose because when the user of my device happens to be seated near a person who continually coughs or sneezes, he may simply take my device by its handle and carry his meal, which would slide back into its sheltering pocket to a different table or place; the food when contained in my device may also be easily re-heated in the same; my device may also be used as a guide for measuring out the food to be served.

When used for our armed forces, my device would prove to be useful in all its branches, and particularly so on board of air-planes and air-liners, where space and storing space are necessarily limited, and where the appliances may be stored away between meals closely side by side; for the same reason one serving person may easily carry a good many of my appliances at the same time; my device will also be highly useful on air-liners and on railroad trains because passengers may then be conveniently served with their meals while remaining in their seats or coach-seats; my device will also be greatly useful at sport events and many other occasions when no eating tables are available. Numerous other uses of my device will suggest themselves while the same is being used in its various forms.

In all the figures shown and described, the fundamental construction of the device is practically the same, the slight variations just serving to emphasize one or the other feature of the device which might be particularly useful on certain occasions or for certain situations. As shown and described, my device retains the food very efficiently in a sheltered compact manner and confined in a comparatively small space.

Finally I wish to state that my device will be equally useful when used by our men in the service as well as in civilian life, and that it will serve a highly important sanitary purpose by very effectively guarding and sheltering the food it contains until the time the same is actually consumed, and thus protect it very effectively from contamination and exposure to pathogenic influences.

I do not wish to restrict myself to the particular construction and arrangement shown, as I realize that some changes may be made in the details of construction without departing from the scope of the invention, but what I claim and desire to secure by Letters Patent is:

1. A sanitary food sheltering and eating plate device, consisting of an eating plate which has part of its face roofed in so as to form a pocket and having an elevation rising from its face and which runs in a transverse direction and near the junction of the roofed-in portion and the non-roofed portion of the device.

2. A sanitary food sheltering and eating plate device, consisting of an eating plate having part of its face roofed in so as to form a pocket and having a V-shaped ridge rising from its face and running in a transverse direction and near the junction of the roofed-in portion and the non-roofed portion of the device.

3. A sanitary food sheltering and eating plate device, consisting of an eating plate having part of its face roofed in so as to form a pocket and having an elevation rising from its face and running in a transverse direction near the junction of the roofed-in and the non-roofed portions, the said roofed-in portion terminating in a standing base which supports the device in an upright standing position.

4. A sanitary food sheltering and eating plate device, consisting of an eating plate having part of its face roofed in so as to form a pocket and having an elevation rising from its face and running in a transverse direction and near the junction of the roofed-in and the non-roofed portions, the said roofed-in portion terminating in a standing base which is adapted to support the device in an upright standing position and the said device being provided with a handle to facilitate moving the device from its normal horizontal to its upright position and vice versa.

MELANIE WOLF.